United States Patent
Ortmann et al.

(10) Patent No.: US 11,548,489 B2
(45) Date of Patent: Jan. 10, 2023

(54) MASTER CYLINDER WITH SEALING ELEMENT

(71) Applicant: Schaeffler Technologies AG & Co. KG, Herzogenaurach (DE)

(72) Inventors: Simon Ortmann, Baden-Baden (DE); Jannick Dominik Herbert Altherr, Singapore (SG); Marcel Philipp Mayer, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/296,803

(22) PCT Filed: Nov. 8, 2019

(86) PCT No.: PCT/DE2019/100963
§ 371 (c)(1),
(2) Date: May 25, 2021

(87) PCT Pub. No.: WO2020/108691
PCT Pub. Date: Jun. 4, 2020

(65) Prior Publication Data
US 2021/0394731 A1 Dec. 23, 2021

(30) Foreign Application Priority Data
Nov. 30, 2018 (DE) .......................... 102018130507.9

(51) Int. Cl.
*B60T 11/236* (2006.01)
*B60T 11/232* (2006.01)
*B60T 7/10* (2006.01)
*B62K 23/06* (2006.01)
*B62L 3/02* (2006.01)

(52) U.S. Cl.
CPC ............. *B60T 11/236* (2013.01); *B60T 7/102* (2013.01); *B60T 11/232* (2013.01); *B62K 23/06* (2013.01); *B62L 3/023* (2013.01)

(58) Field of Classification Search
CPC ........ B62L 3/023; B60T 11/232; B60T 7/102; B60T 11/236
See application file for complete search history.

(56) References Cited

FOREIGN PATENT DOCUMENTS

| DE | 102013217056 A1 | 3/2015 | |
| DE | 102013227027 A1 * | 6/2015 | ............. B60T 11/16 |
| WO | 2018145691 A1 | 8/2018 | |

OTHER PUBLICATIONS

Machine translation of DE-102013227027.*

* cited by examiner

*Primary Examiner* — Thomas E Lazo
*Assistant Examiner* — Daniel S Collins

(57) ABSTRACT

A sealing element for sealing a pressure chamber is provided in a master cylinder for a clutch or brake system. The sealing element has a sealing lip for sealing a feed of hydraulic fluid from a reservoir mounted on a housing of the master cylinder into the pressure chamber and has a sealing structure for sealing the pressure chamber from the surroundings of the pressure chamber.

14 Claims, 7 Drawing Sheets

MASTER CYLINDER WITH SEALING ELEMENT

CROSS-REFERENCE TO RELATED APPLICATIONS

This application is the U.S. National Phase of PCT Appln. No. PCT/DE2019/100963 filed Nov. 8, 2019, which claims priority to DE 102018130507.9 filed Nov. 30, 2018, the entire disclosures of which are incorporated by reference herein.

TECHNICAL FIELD

The disclosure relates to a master cylinder for a clutch or brake system having a sealing element.

BACKGROUND

In clutch or brake systems, in the case of bicycles, for example, a hand lever is used to move a piston in a master cylinder in order to build up pressure in a pressure chamber filled with a hydraulic fluid. This pressure is passed on via a connection to a slave cylinder, via which the clutch or brake is actuated by a piston that moves inside it. Seals are provided to keep the hydraulic fluid in the master cylinder. Nevertheless, losses of hydraulic fluid can occur, which have to be compensated from a reservoir; the reservoir can preferably be mounted on a housing of the master cylinder. The compensation should preferably take place in a depressurized state and should not negatively affect the function of the clutch or brake system, especially the master cylinder.

The German patent application DE 10 2013 217 056 A1 discloses a master armature intended for handlebar-guided vehicles, which is actuated via a hand lever. A piston is moved in a pressure chamber via the hand lever. The piston moves a sealing element with it, which closes a feed for hydraulic fluid from a reservoir mounted on the master armature into the pressure chamber. A further sealing element seals the master armature from the environment.

SUMMARY

The object of the disclosure is to specify a master cylinder in which the seal can be achieved by means of a reduced number of components.

This object is achieved by a master cylinder according to the description provided herein.

The master cylinder according to the disclosure for a clutch or brake system has a housing in which a pressure chamber is formed. A piston can be at least partially introduced into the pressure chamber and can thus build up pressure in the pressure chamber, which pressure can be passed on to a slave cylinder in a known manner. A reservoir for hydraulic fluid is provided on the housing, from which hydraulic fluid can enter the pressure chamber via a feed in order to compensate for hydraulic fluid losses. A preferably annular sealing element is arranged between the housing and the piston. The sealing element has an outer sealing lip for sealing the feed for hydraulic fluid from the pressure chamber; the sealing lip seals the supply from the pressure chamber when the piston is displaced in the direction of the pressure chamber, so that pressure can be built up in the pressure chamber. According to the disclosure, the sealing element has formed a sealing structure on a side of the sealing element facing away from the pressure chamber, which sealing structure seals the pressure chamber from the surroundings of the pressure chamber. This eliminates the need for a separate seal to seal off the pressure chamber from the environment, thus reducing the number of components required.

In one embodiment, the sealing element has an inner sealing lip which faces the pressure chamber and is adjacent to the piston. The inner sealing lip, in interaction with the outer sealing lip, serves primarily to seal or close off the feed for hydraulic fluid from the pressure chamber when an overpressure is built up in the pressure chamber, i.e., when the piston is introduced into the pressure chamber. For this purpose, when the piston is inserted into the pressure chamber it pushes the inner sealing lip radially outward, and as a result of the elastic deformation of the sealing element caused thereby, the outer sealing lip is pressed against the housing and thus seals the feed for hydraulic fluid provided in the area of the sealing element from the pressure chamber. This interaction of the piston with the sealing element is particularly supported in one embodiment by the fact that the piston has a bevel on the side facing the pressure chamber, more precisely in the area which is to come into contact with the inner sealing lip. By the movement of the piston in the direction of the pressure chamber, preferably a piston with a bevel as just mentioned, the inner and outer sealing lips can be pre-tensioned in the manner just described, which leads to the hydraulic fluid feed being sealed off from the pressure chamber. The inner sealing lip is pressed against the piston at the same time, in the case of a piston with a bevel against the bevel, and thereby seals the pressure chamber in the area of the piston or the bevel. In each embodiment of the disclosure, the hydraulic fluid feed is sealed from the pressure chamber by the outer sealing lip being pressed radially outward against the housing. The sealing element in this case is not moved along with the piston in an axial direction.

In one configuration, the sealing structure comprises an outer sealing structure and an inner sealing structure. Inner and outer sealing structures can be designed in an O-ring geometry, for example. The outer sealing structure can protrude outwardly beyond the outer sealing lip in the radial direction.

In one embodiment, a stop structure is provided on the sealing element between the outer sealing lip and the sealing structure. The stop structure is formed by one or more projections formed on the sealing element and is designed to abut against the housing. The stop structure represents a defined stop for the sealing element when it is installed in the master cylinder and is used to adjust the dimensions. Furthermore, the stop structure also enables the contact pressures of the sealing element against the housing to be distributed. This distribution can be influenced by the number and shape of the projections. All common elastomers can be used as the material for the sealing element.

In one embodiment, at least one radial bore is made in the sealing element. In a specific development of the embodiments described above, the bore runs from a point between the outer sealing lip and the outer sealing structure to a point between the inner sealing lip and the inner sealing structure.

In one embodiment of the master cylinder, at least one recess is provided on a side of the sealing element facing the housing. The at least one recess ensures better ventilation, in particular despite manufacturing tolerances. Likewise, the at least one recess ensures an improved flow of the hydraulic fluid to be fed into the pressure chamber.

In one embodiment, a seal holder is provided for fixing the sealing element in the housing. The seal holder can be, for example, welded or screwed to the housing. But other possibilities are also conceivable for fixing the seal holder in the housing. In the case of lower working pressures of the master cylinder, a press connection between the seal holder and the housing can also be considered.

In one embodiment, a covering cap is provided on the housing. The covering cap serves to protect the master cylinder from contamination. At the same time, the covering cap also acts as an end stop for the piston when the piston moves out of the pressure chamber in the axial direction.

In general, the reservoir can be designed as a chamber, with a lid being provided to close it to the environment. The lid can be welded, for example, or, with the inclusion of a seal, screwed, riveted or otherwise fastened. If the lid is to be welded to the chamber, then the lid is advantageously designed to be laser-transparent. If the cover is transparent in the range of visible light, this can advantageously be used to check the fill level. The chamber preferably has a venting device. This can be a screw plug through which the chamber can be filled and also vented.

In one embodiment, the housing is designed in two parts. A first housing part carries mechanical elements for actuating the piston. A second housing part encloses the pressure chamber. Furthermore, the second housing part can carry the reservoir and the feed for hydraulic fluid, as well as a connection for a hydraulic line to a slave cylinder. In addition, the second housing part can have means with which the master cylinder can be fixed in an installation environment. This can be means with which the master cylinder can be attached to the handlebars of a bicycle. In a modification, it is also possible that the means for fixing the master cylinder in an installation environment are formed on the first housing part. In any case, the first housing part fulfills the functions of protection against contamination, the stop for the piston when moving in the axial direction out of the pressure chamber and the seal holder, i.e., functions that are fulfilled in other embodiments described above by separate components.

In one embodiment, a return spring for the piston is provided in the pressure chamber. In one embodiment, a hand lever for displacing the piston is provided on the housing.

The advantage of a two-part design of the housing explained above when using a hand lever is that the hydraulic surface or the diameter of the seal can be selected to be significantly larger without the lever ratio of the hand lever having to be changed. In the prior art, the pressure chamber otherwise collides with tabs for fastening the hand lever and the associated mechanism.

BRIEF DESCRIPTION OF THE DRAWINGS

In the following, the disclosure and its advantages are explained in more detail with reference to the accompanying drawings.

The drawings merely represent exemplary embodiments of the disclosure and are therefore not to be construed as limiting the disclosure to the exemplary embodiments shown.

DETAILED DESCRIPTION

Figure 1:
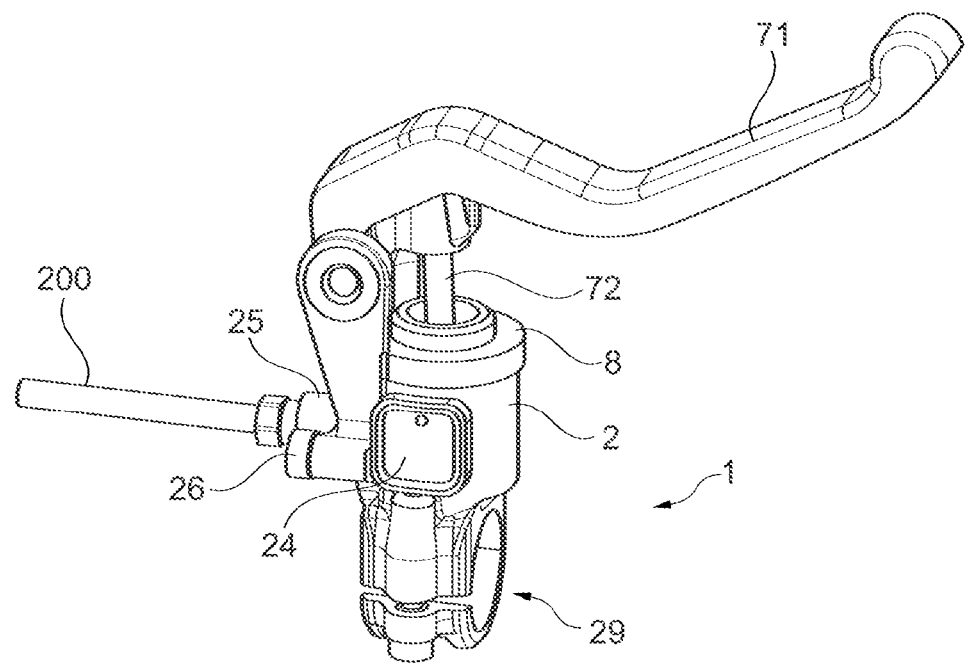
FIG. 1 shows a perspective view of a master cylinder according to the disclosure.

FIG. 1 shows a master cylinder 1 according to the disclosure. In the embodiment shown, the master cylinder 1 is actuated by a hand lever 71 via a piston rod 72. A reservoir 24 for hydraulic fluid is mounted on a housing 2 of the master cylinder 1. Furthermore, a connection 25 for a hydraulic line 200 and a vent screw 26 for the reservoir 24 are provided on the housing 2. The housing 2 also has means 29 for fixing the housing 2 in an installation environment, here in the form of a bracket for fixing the housing 2 to the handlebars of a bicycle (not shown).

Figure 2:
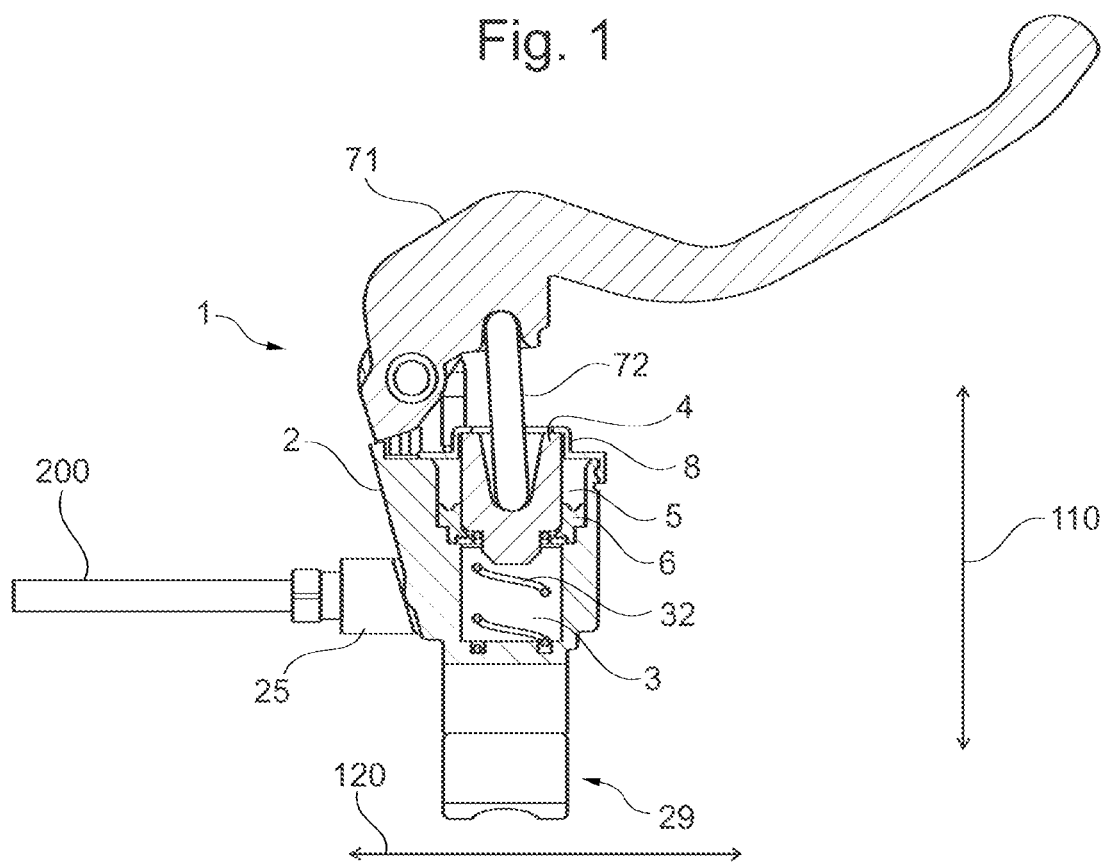
FIG. 2 shows a sectional view of the master cylinder shown in FIG. 1.

FIG. 2 shows a sectional view through the master cylinder 1 of FIG. 1. Several of the elements shown have already been explained in connection with FIG. 1. FIG. 2 also shows the piston 4 which is to be actuated via the piston rod 72 and which can be inserted, at least partially, in the axial direction 110 into a pressure chamber 3 located in the housing 2. It can also be seen that the covering cap 8 serves as a stop for the piston 4 when the latter moves out of the pressure chamber 3 in the axial direction 110. In the housing 2, adjacent to the piston 4, the seal holder 5 and the sealing element 6 are arranged. The seal holder 5 fixes the sealing element 6 in the axial direction 110 and has a stabilizing effect on the sealing element 6 in the radial direction 120. A return spring 32 is provided in the pressure chamber 3; the function of the return spring 32 is to push the piston 4 out of the pressure chamber 3 in the axial direction 110 when the hand lever 71 is relieved. If the piston 4 is pushed into the pressure chamber 3, a pressure builds up in the hydraulic fluid located there (not shown), which is passed on via connection 25 to the hydraulic line 200 and from there to a slave cylinder, not shown.

Figure 3:
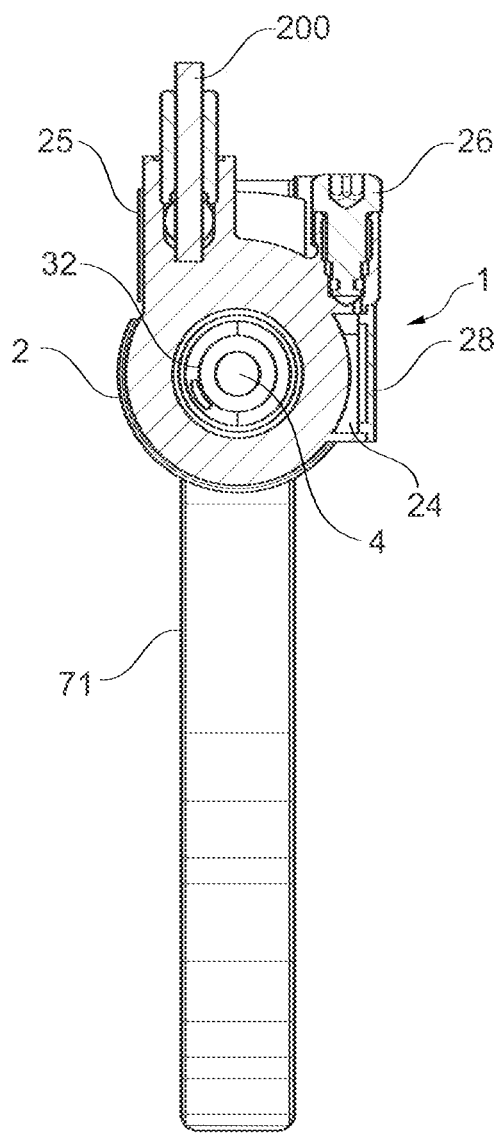
FIG. 3 shows a further sectional view of a master cylinder according to the disclosure.

FIG. 3 shows a view of the master cylinder 1 cut open in a plane perpendicular to the axial direction 110 (see FIG. 2). All the elements shown have already been shown in previous figures, and the lid 28 of the reservoir 24 is now also referenced.

Figure 4:
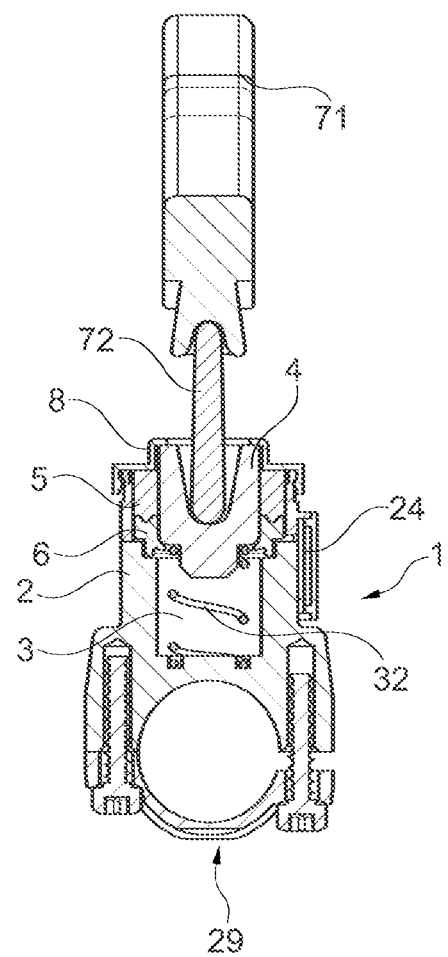
FIG. 4 shows a further sectional view of a master cylinder according to the disclosure.

FIG. 4 shows a further sectional view of a master cylinder 1 according to the disclosure, the sectional plane running parallel to the axial direction 110 (see FIG. 2). All elements referenced have already been discussed above.

Figure 5:
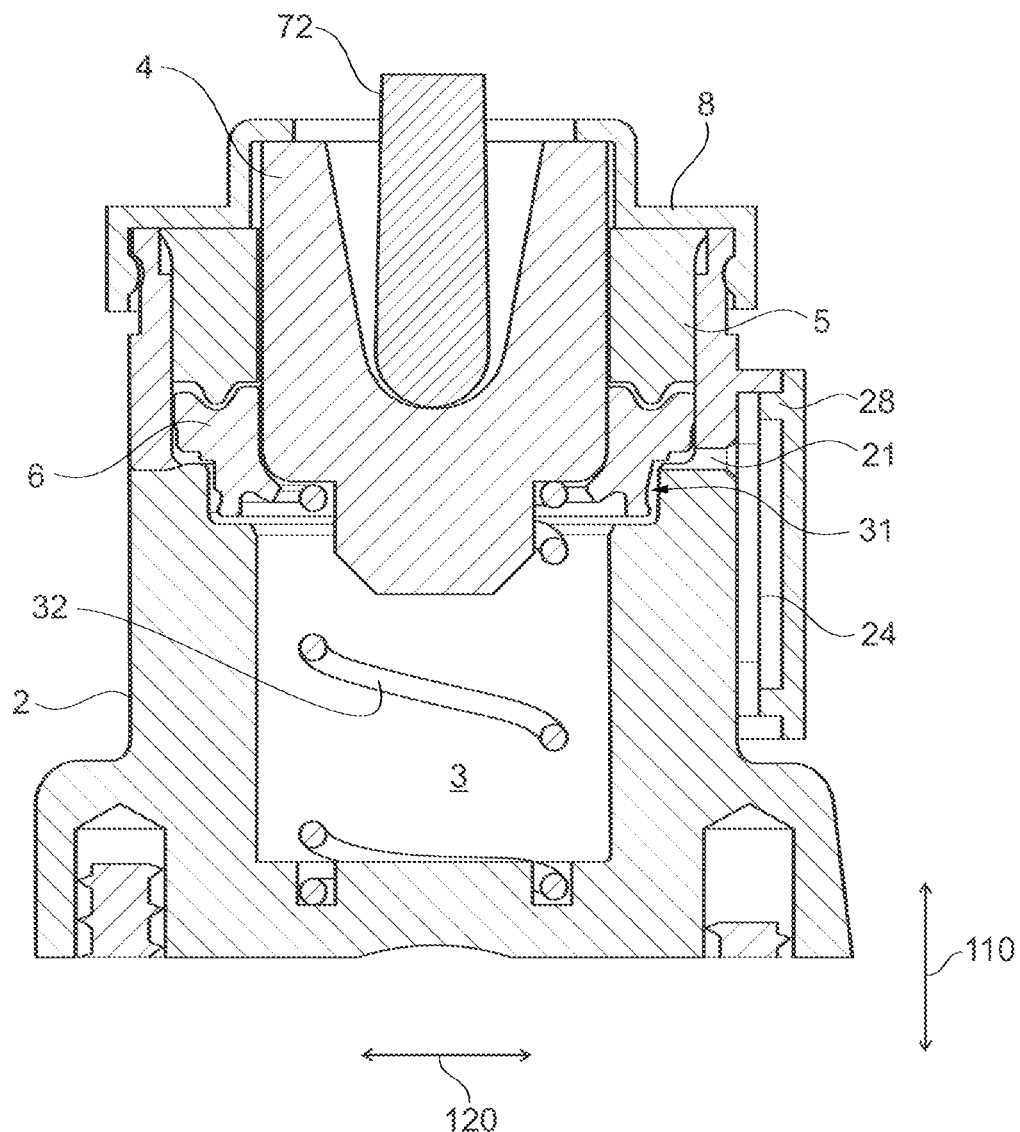
FIG. 5 shows a detailed view of a sectional view of a master cylinder according to the disclosure.

FIG. 5 shows a detailed view of the master cylinder according to the disclosure in the form of an enlarged detail from FIG. 4. The great majority of the elements referenced have already been explained above. In particular, the arrangement of the seal holder 5 and the sealing element 6 in the housing 2 can be clearly seen. FIG. 5 also shows a feed 21 for hydraulic fluid, which connects the reservoir 24 for hydraulic fluid to the pressure chamber 3. When the piston 4 moves into the pressure chamber 3 in the axial direction 110, the sealing element 6 is elastically deformed so that areas of the sealing element 6 are forced outward in the radial direction 120, i.e., away from the piston 4, and thus seal the feed 21 from the pressure chamber 3. In this way, pressure can be built up in the pressure chamber 3 without this pressure being communicated to the reservoir 24 via the feed 21. In order to seal the feed line 21, it is not necessary to displace the sealing element 6 in the axial direction 110, for example together with the piston 4. If the piston 4 moves out of the pressure chamber 3 in the axial direction 110, the sealing element 6 releases the feed 21 again and, if necessary, hydraulic fluid can flow from the reservoir 24 via the feed 21 and a channel 31 into the pressure chamber 3 to compensate for any hydraulic fluid losses there. The channel 31 is defined by the sealing element 6 and the housing 2 and runs annularly around the sealing element 6. The action of the covering cap 8 as a stop for the piston 4 when the piston 4 moves out of the pressure chamber 3 in the axial direction 110 can also be seen in the illustration.

Figure 6:
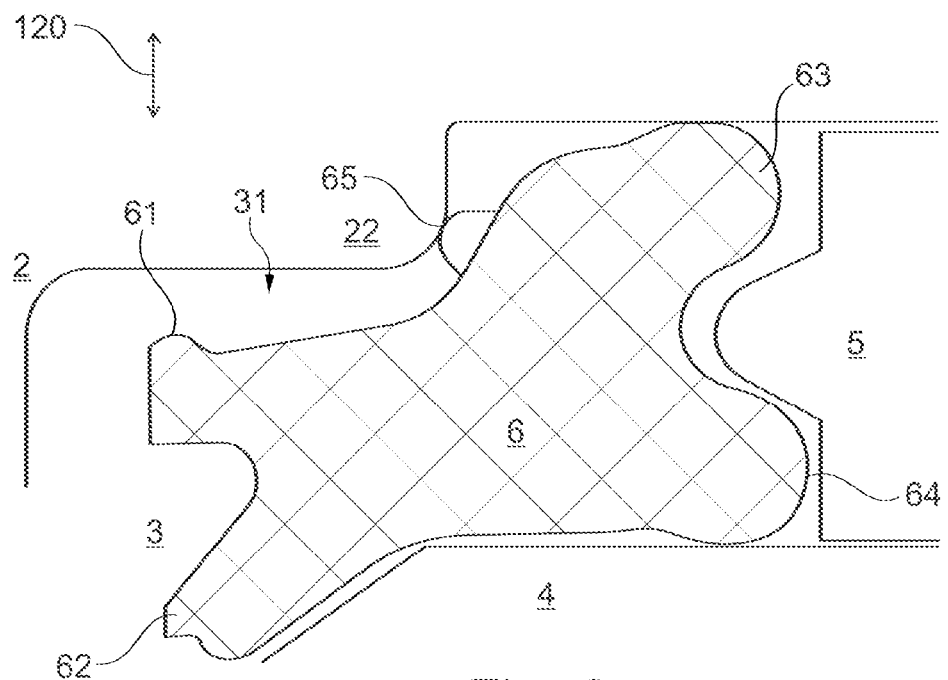
FIG. 6 shows a sectional view of the sealing element inserted into a master cylinder according to the disclosure.
Figure 7:
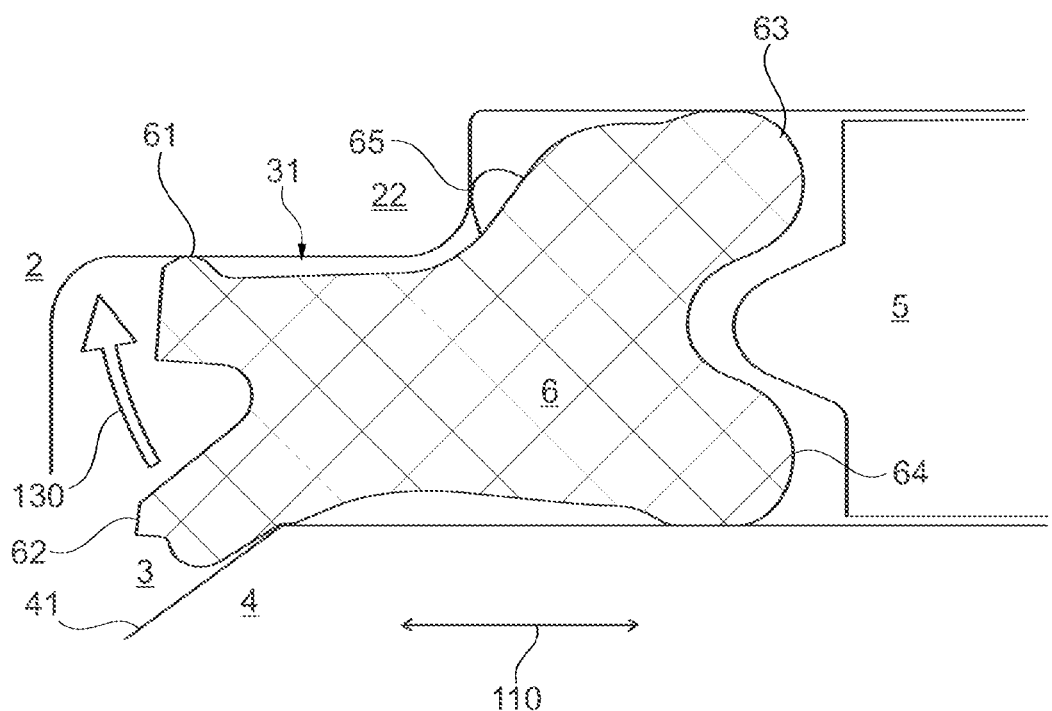
FIG. 7 shows a sectional view of the sealing element inserted into a master cylinder according to the disclosure, with the piston displaced.

FIGS. 6 and 7 show the sealing element 6, inserted into the housing 2, in detail, as well as the interaction of the sealing element 6 with the piston 4. FIG. 6 shows sealing element 6 inserted into the housing 2 in the unloaded state in cross section. Areas of the housing 2, the pressure chamber 3, the seal holder 5 and the piston 4 are shown in more detail. Also shown are the outer sealing structure 63 and the inner sealing structure 64, which together form the sealing structure which seals the pressure chamber 3 from the surroundings of the pressure chamber 3. Outer sealing lip 61 and inner sealing lip 62 are also shown. A stop structure 65 of the sealing element 6 abuts against a projection 22 of the housing 2 and thus ensures a defined installation position of the sealing element 6 in the master cylinder. The outer sealing structure 63 protrudes outwardly beyond the outer sealing lip 61 in the radial direction 120. The channel 31 is open to the pressure chamber 3.

FIG. 7 shows the sealing element 6 in a loaded state, that is to say in a situation in which the piston 4 is moved in the axial direction 110 towards the pressure chamber 3. When the piston 4 moves in the axial direction 110 towards the pressure chamber 3, the piston 4, more precisely the bevel 41 formed on the piston 4 in the embodiment shown, forces the inner sealing lip 62 outward in the direction of the arrow 130. As a result of the elastic deformation of the sealing element 6 brought about in this way, the outer sealing lip 61 is pressed against the housing projection 22. As a result, the channel 31 is closed toward the pressure chamber 3. In particular, the channel 31 and the feed 21 connected to it (see FIG. 5) for hydraulic fluid are thus protected against the pressure that builds up in the pressure chamber 3 during the movement of the piston 4. In the sectional illustration shown, the feed 21 for hydraulic fluid is not captured, because it lies outside the sectional plane. A seal is nevertheless required over the entire circumference of the annular sealing element 6, since the channel 31 is an annular channel which is connected to the feed 21, as shown in FIG. 5.

Figure 8:
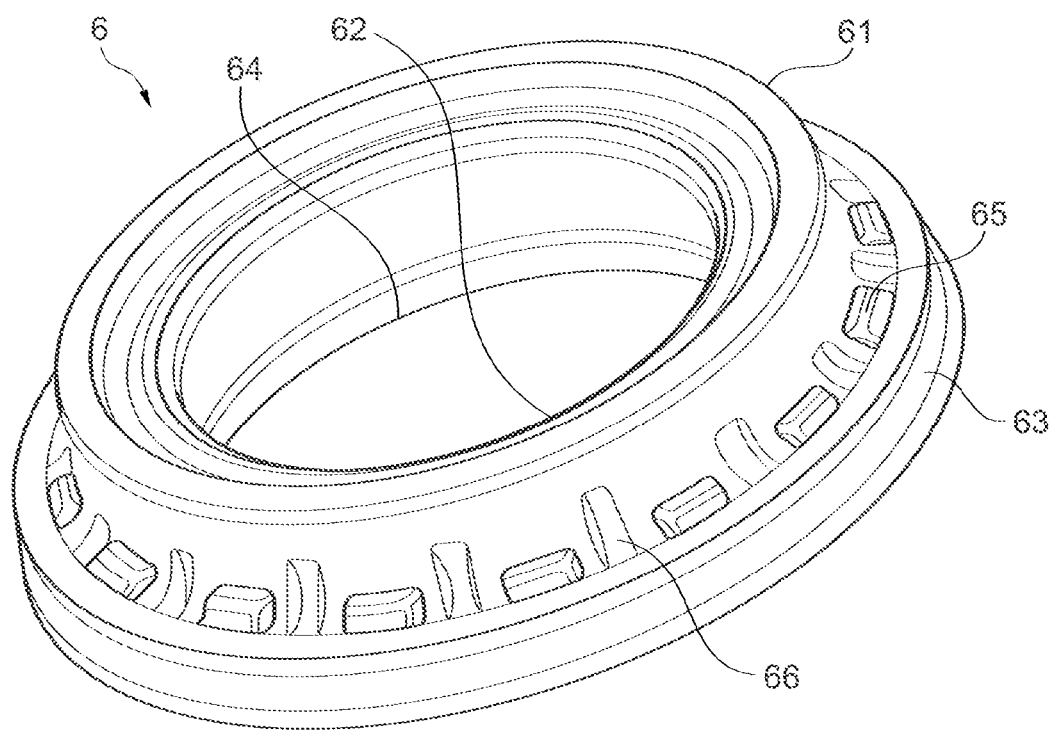
FIG. 8 shows a perspective view of the sealing element.

FIG. 8 is a perspective view of an embodiment of the sealing element 6. The sealing element 6 is annular. The outer sealing lip 61, the inner sealing lip 62, the outer sealing structure 63 and the inner sealing structure 64 can be seen, which are each closed over an entire circumference of the sealing element 6 in order to be able to fulfill their respective sealing function.

Furthermore, projections can be seen which form the stop structure 65. The stop structure 65 is not closed over the whole circumference of the sealing element 6, rather there are gaps between the projections, so that the stop structure 65 itself does not exert any sealing effect. The embodiment of the sealing element 6 shown also has recesses 66, which here are arranged in particular between the projections of the stop structure 65. The recesses 66 ensure a resupply of hydraulic fluid, which reaches the sealing element 6 via the feed 21 (see FIG. 5) in the area between the outer sealing lip 61 and the outer sealing structure 63, into the pressure chamber 3 (see FIG. 5), as well as improved venting, also in view of manufacturing tolerances.

In the exemplary embodiment shown, the outer sealing structure 63 and the inner sealing structure 64 have an O-ring geometry.

Figure 9:
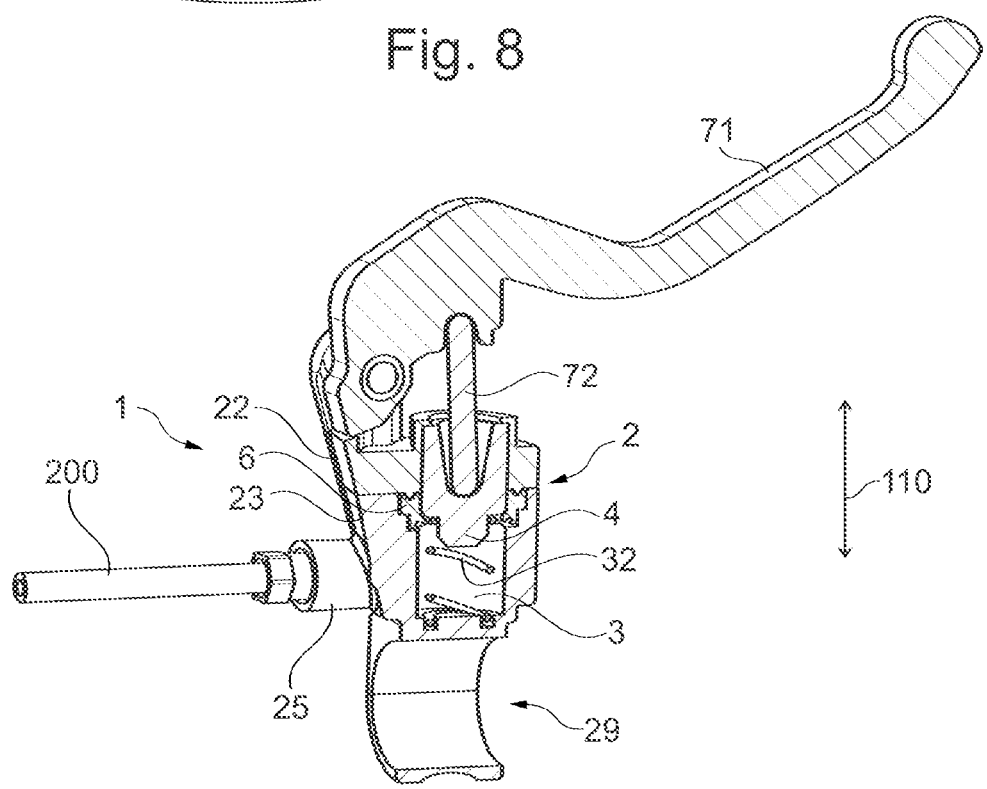
FIG. 9 shows a sectional view of a master cylinder according to the disclosure with a two-part housing.

FIG. 9 shows a further embodiment of the master cylinder 1 according to the disclosure, similar to the embodiment shown in FIGS. 1 and 2. In the embodiment shown in FIG. 9, the housing 2 is designed in two parts, the housing 2 comprises a first housing part 22 and a second housing part 23. The first housing part 22 carries the mechanical elements for actuating the piston 4, here these are specifically hand lever 71 and piston rod 72. The first housing part 22 also acts as protection for the master cylinder 1 from contamination and as a stop for the piston 4 when the latter moves out of the pressure chamber 3 in the axial direction 110. The first housing part 22 thus performs the functions of the covering cap 8 in the embodiment shown in FIGS. 1 and 2. Furthermore, the first housing part 22 is designed in such a way that the first housing part 22 also performs the function of fixing and stabilizing the sealing element 6 of the seal holder 5 of the embodiment shown in FIGS. 1 and 2. This saves additional components. The pressure chamber 3, in which a return spring 32 is also arranged in this embodiment, is formed in the second housing part 23. Furthermore, the connection 25 for a hydraulic line 200 is provided on the second housing part 23. Means 29 for fastening the housing 2 in an installation environment, here specifically on the handlebars of a bicycle, are also provided on the second housing part 23.

First housing part 22 and second housing part 23 can be, for example, welded, screwed, riveted, soldered, pressed, glued or otherwise connected to one another. It is important that the connection withstands the mechanical stresses that occur when the piston 4 is actuated.

Embodiments are also conceivable in which the first housing part performs the function of the covering cap, that is, to protect the master cylinder from contamination and to act as a stop for the piston, but wherein a separate seal holder is still provided.

Figure 10:
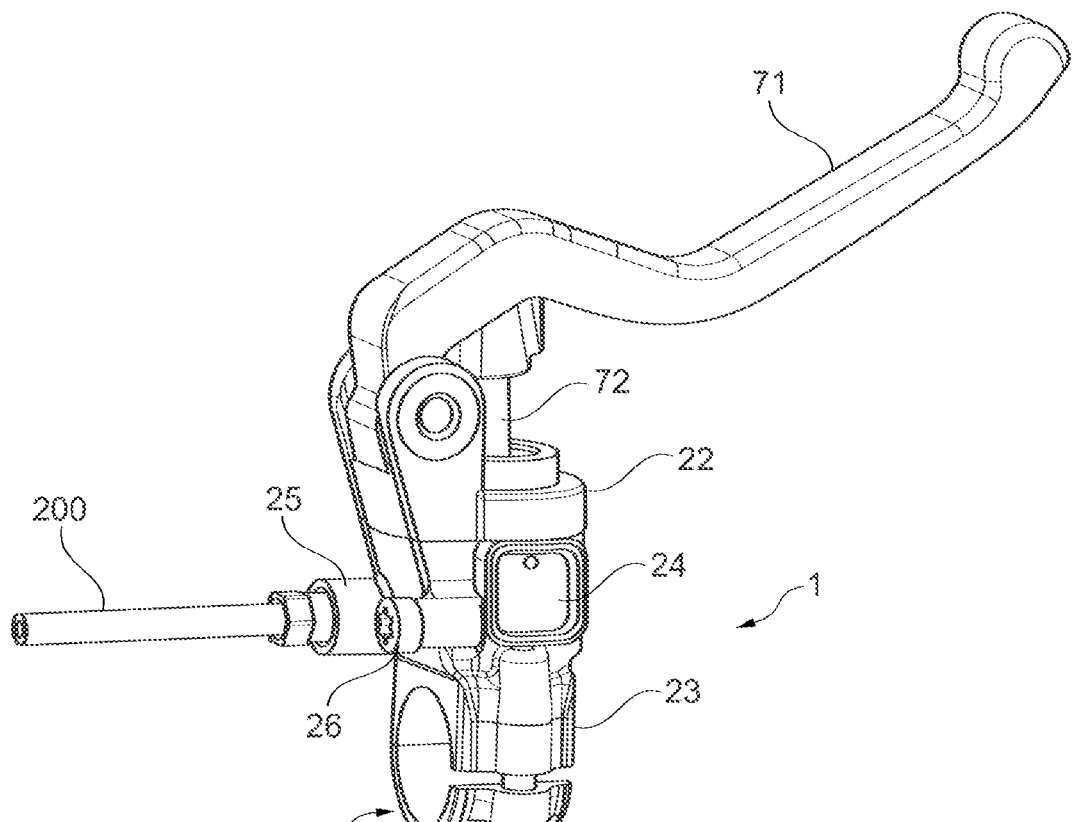
FIG. 10 shows a perspective view of the master cylinder from FIG. 9.

FIG. 10 shows a perspective view of the master cylinder 1 according to the disclosure from FIG. 9. In addition to the elements already explained in connection with FIG. 9, the reservoir 24 can also be seen here, which is arranged on the second housing part 23. The vent screw 26 is also shown.

Figure 11:
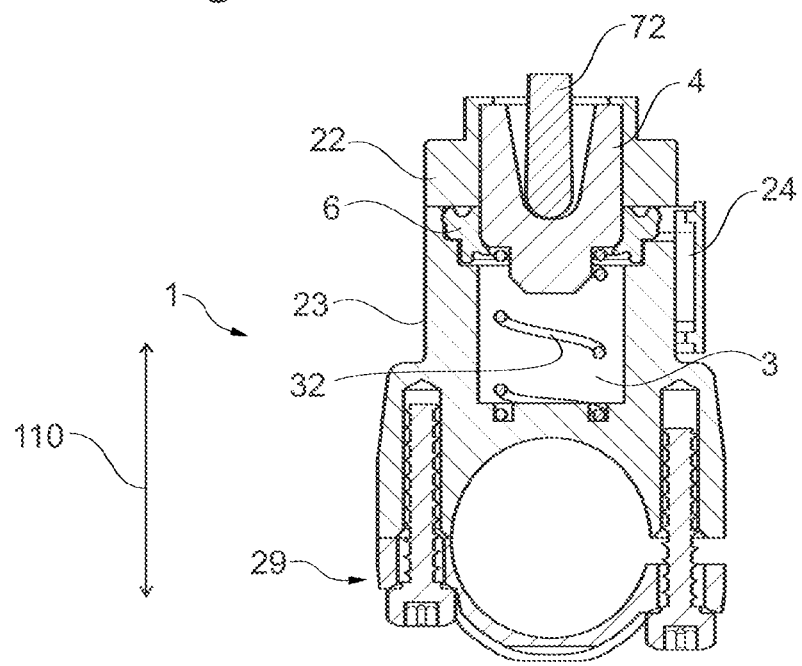
FIG. 11 shows a detailed view of a sectional view of the master cylinder from FIG. 9.

FIG. 11 is a sectional view of part of the master cylinder 1 according to the disclosure from FIG. 9. The great majority of the elements referenced have already been explained in the context of FIGS. 9 and 10. In the view shown, it can be clearly seen that the first housing part 22 acts as a stop for the piston 4 when the latter is moved out of the pressure chamber 3 in the axial direction 110. The function of the first housing part 22 for supporting and stabilizing the sealing element 6 can also be seen.

In the embodiment shown in FIGS. 9 to 11, the first housing part 22 with hand lever 71 and piston rod 72 carries the mechanical elements for displacing the piston 4. The second housing part 23, on the other hand, comprises the hydraulic elements, i.e., the pressure chamber 3, the connection 25 and the reservoir 24. In addition, the second housing part 23 also carries the means 29 for fixing the housing 2 in an installation environment. This division of functions between the first housing part 22 and the second housing part 23 is an example of a division of functions. Other divisions of the functions are also conceivable. In particular, the means 29 for fixing the housing 2 in an installation environment can also be provided on the first housing part 22. The first housing part 22 could then extend over the second housing part 23 in the axial direction 110, or the second housing part 23 could be pushed into the first housing part 22 in the axial direction 110. Alternatively, the means 29 for fixing the housing 2 in an installation environment could also be attached to the side of the first housing part 22.

Figure 12:
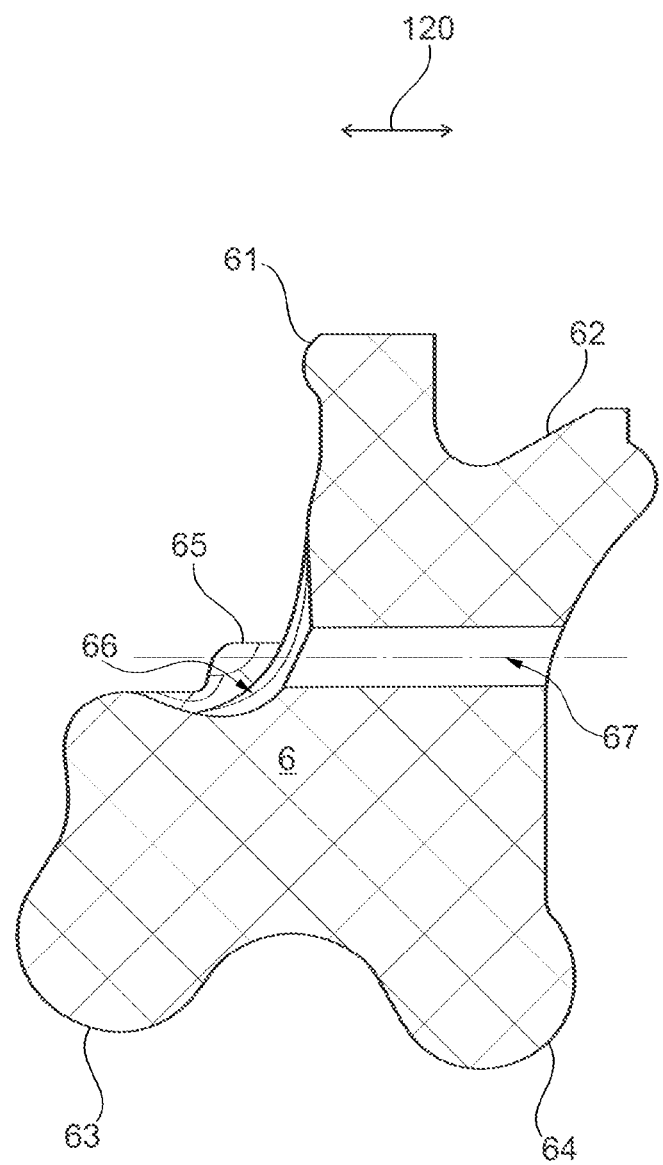
FIG. 12 shows a further exemplary embodiment of a sealing element in a sectional view.

FIG. 12 shows a further exemplary embodiment of a sealing element 6 in a sectional view. The sealing element 6 has an outer sealing lip 61, an inner sealing lip 62, an outer sealing structure 63, and an inner sealing structure 64. Furthermore, the sealing element 6 has a stop structure 65 and recesses 66, as already discussed above, in particular in connection with FIGS. 6 to 8. In the embodiment shown in FIG. 12, the sealing element 6 has at least one radial bore 67, that is to say running in the radial direction 120, which extends from a position between the outer sealing lip 61 and the outer sealing structure 63 to a position between the inner sealing lip 62 and the inner sealing structure 64.

LIST OF REFERENCE NUMBERS

1 Master cylinder
2 Housing
3 Pressure Chamber
4 Piston
5 Seal holder
6 Sealing element
8 Covering cap
21 Feed for hydraulic fluid
22 First housing part
23 second housing part
24 Reservoir
25 Connection for hydraulic line
26 Vent screw
28 Lid of the reservoir
29 Means for fixing the housing
31 Channel
32 Return spring
41 bevel
61 Outer sealing lip
62 Inner sealing lip
63 Outer sealing structure
64 Inner sealing structure
65 Stop structure
66 Recess
67 Bore
71 Hand lever
72 Piston rod
110 Axial direction
120 Radial direction
130 Arrow
200 Hydraulic line

The invention claimed is:

1. A master cylinder for a clutch or brake system, the master cylinder comprising: a housing, a pressure chamber formed in the housing, a piston that can be at least partially inserted into the pressure chamber, a reservoir mounted on the housing for a hydraulic fluid, a feed for the hydraulic fluid from the reservoir into the pressure chamber, and a sealing element arranged between the housing and the piston with an outer sealing lip for sealing the feed from the pressure chamber, wherein the sealing element has a sealing structure on a side of the sealing element facing away from the pressure chamber, which sealing structure seals the pressure chamber from an environment of the pressure chamber, wherein the sealing element has a stop structure which is formed on the sealing element between the outer sealing lip and the sealing structure by one or more projections formed on the sealing element and is provided to abut against the housing.

2. The master cylinder according to claim 1, wherein the sealing element has an inner sealing lip which faces the pressure chamber and is adjacent to the piston.

3. The master cylinder according to claim 1, wherein the sealing element has at least one radial bore.

4. The master cylinder according to claim 1, wherein a seal holder is provided for fixing the sealing element in the housing.

5. The master cylinder according to claim 1, wherein a covering cap is provided on the housing, which covering cap also acts as an end stop for the piston.

6. The master cylinder according to claim 1, wherein the housing is designed in two parts in such a way that a first housing part carries mechanical elements for actuating the piston and a second housing part encloses the pressure chamber.

7. The master cylinder according to claim 6, wherein the first housing part comprises a bracket configured for fastening the master cylinder in an installation environment.

8. The master cylinder according to claim 1, wherein a return spring for the piston is provided in the pressure chamber.

9. The master cylinder according to claim 1, wherein a hand lever for displacing the piston is provided on the housing.

10. A master cylinder for a clutch or brake system, the master cylinder comprising:
a housing;
a pressure chamber formed in the housing;
a piston configured to be moveable in and out of the pressure chamber;
a reservoir mounted on the housing for a hydraulic fluid;
a feed connecting the reservoir and the pressure chamber, wherein the feed is arranged to route the hydraulic fluid from the reservoir into the pressure chamber; and
a sealing element arranged between the housing and the piston, wherein the sealing element is configured to selectively seal the feed from the pressure chamber such that the hydraulic fluid cannot flow between the reservoir and the pressure chamber, wherein the sealing element includes an outer sealing lip arranged to seal the feed from the pressure chamber when the piston moves into the pressure chamber wherein the sealing element has a sealing structure on a side of the sealing element facing away from the pressure chamber, wherein the sealing structure is configured to seal the pressure chamber from an environment of the pressure chamber, wherein the sealing element has a stop structure formed on the sealing element between the outer sealing lip and the sealing structure by one or more projections formed on the sealing element, wherein the stop structure is arranged to abut against the housing.

11. The master cylinder according to claim 10, wherein the sealing element is configured to:

seal the feed from the pressure chamber when the piston moves into the pressure chamber; and unseal the feed from the pressure chamber such that the hydraulic fluid can flow between the reservoir and the pressure chamber when the piston moves out of the pressure chamber.

12. The master cylinder according to claim 10, wherein the sealing element is configured to elastically deform in a radial direction away from the piston when the sealing element seals the feed from the pressure chamber.

13. The master cylinder according to claim 10, wherein the sealing element has an inner sealing lip positioned between the outer sealing lip and the piston facing the pressure chamber.

14. A master cylinder for a clutch or brake system, the master cylinder comprising:

a housing, a pressure chamber formed in the housing, a piston that can be at least partially inserted into the pressure chamber, a reservoir mounted on the housing for a hydraulic fluid, a feed for the hydraulic fluid from the reservoir into the pressure chamber, and a sealing element arranged between the housing and the piston with an outer sealing lip for sealing the feed from the pressure chamber, wherein the sealing element has a sealing structure on a side of the sealing element facing away from the pressure chamber, which sealing structure seals the pressure chamber from an environment of the pressure chamber, wherein the sealing element has at least one radial bore.

* * * * *